Patented Nov. 3, 1931

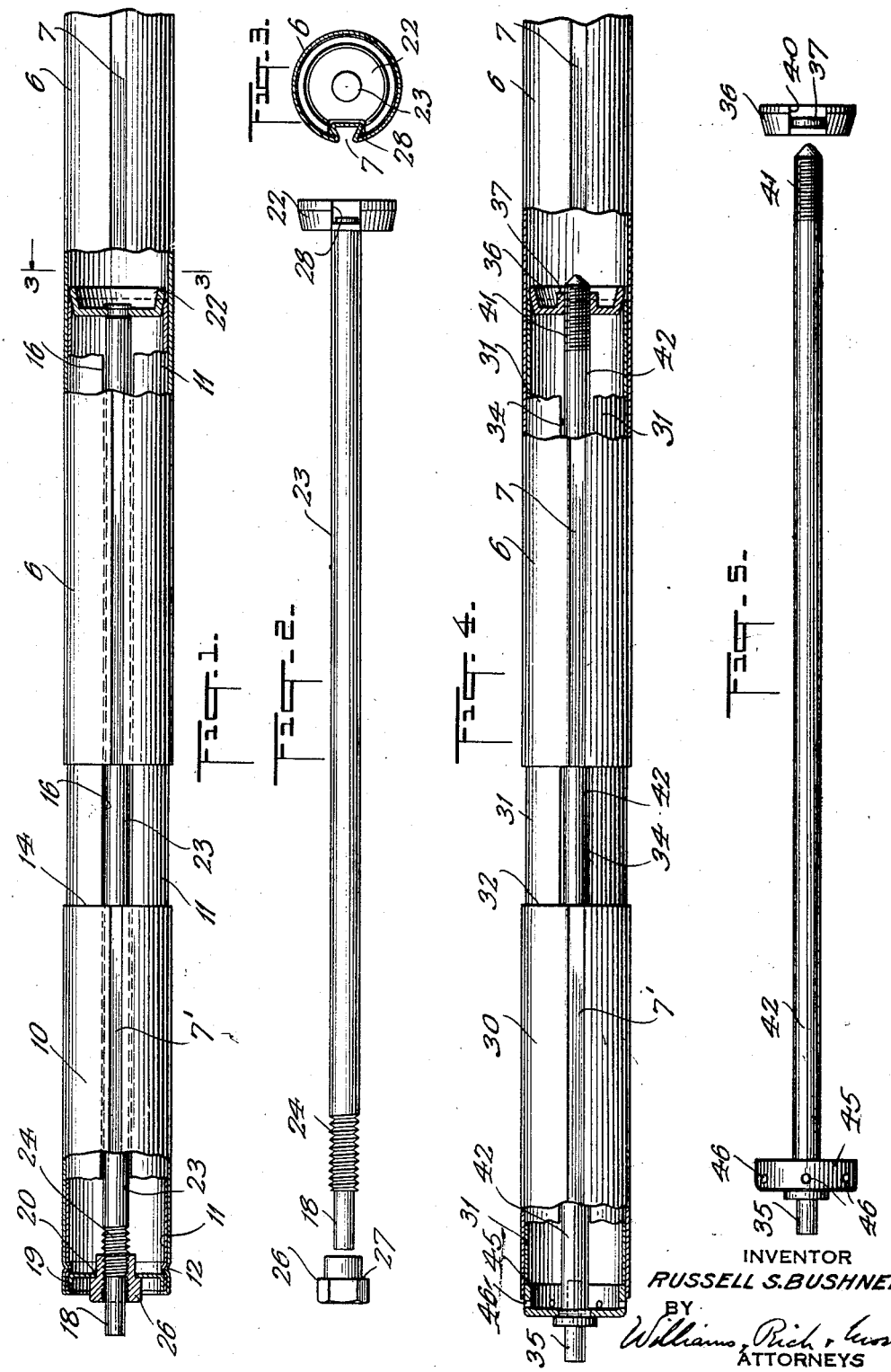

1,830,223

UNITED STATES PATENT OFFICE

RUSSELL STEWARD BUSHNELL, OF NEW YORK, N. Y., ASSIGNOR TO STEWART HARTSHORN COMPANY, OF EAST NEWARK, NEW JERSEY, A CORPORATION OF NEW JERSEY

SHADE ROLLER LOCKING EXTENSION

Application filed November 4, 1930. Serial No. 493,270.

The invention relates to certain new and useful improvements in shade rollers and particularly in extensible metal shade rollers.

The general object of the invention is to provide new and improved means for locking the two parts of the roller in any desired relative position. Further objects of the invention are to provide such a locking device which is simple and inexpensive and which may be operated without the use of special tools.

The invention is illustrated in the accompanying drawings, wherein Fig. 1 is a side elevation, partly in section, of a portion of a shade roller embodying the invention; Fig. 2 is an elevation of parts of the locking mechanism used in the embodiment shown in Fig. 1; Fig. 3 is a cross section of the roller shown in Fig. 1, taken at the line 3—3 of Fig. 1; Fig. 4 is a side elevation, partly in section, of part of a roller showing another embodiment of the invention; and Fig. 5 is a side elevation of some of the parts comprising the locking means in the embodiment illustrated in Fig. 4. Similar reference numerals in the drawings refer to like parts.

Referring to the drawings, Fig. 1 shows part of a shade roller formed of metal tubing. The main body portion 6 of the roller has a groove 7 in which the end of the shade carried by the roller is secured by means of a fillet of wood or by similar means. In the body 6 is the spring and other mechanism which operates the roller, which is not shown.

The roller has an extension portion 10 which is slidably connected with the body portion 6 by means of a resilient tubular member 11. In the extension portion 10 is a groove 7' in line with the groove 7 in the body portion. This resilient tubular member 11 is permanently secured in the extension member 10 by means of the groove 12 which is formed in the tubing near the end of the roller and clinches the walls of the extension portion 10 and the tubular member 11 together. It is further secured by soldering the end of the extension portion 10 to the tubular member 11 at the point 14.

In the tubular member 11, which has an outside diameter of the same dimension, as the inside diameter of the body portion 6, there is a slot 16. This slot has a dual purpose, namely, to accommodate the groove 7 in the body and the groove 7' in the extension 10 and to make the walls of the tubular member 11 expansible. The cooperation of the groove 7 with the slot 16 in the tubular member 11 prevents the rotation of the parts relative to one another and keeps the groove 7' in the extension 10 and the groove 7 in the body 6 in alinement at all times.

As will readily be understood, the length of the roller may be varied to suit windows of different dimensions by sliding the extension 10 and its integral tubular member 11 in and out of the body 6. This changes the distance between the pintle 18 and the corresponding pintle on the other end of the roller, which is not shown.

The means for locking the extension 10 and the body 6 in any desired relative position will now be described. In the end of the extension 10 is a metal plug 19 which has a central hole 20. This plug 19 is immovably secured in place by the groove 12 and the end of the wall of the extension 10 which is turned in over it. Fig. 2, shows locking means comprising a conical expander 22 fixed to a rod 23. On the end of the rod 23 opposite to the expander 22 is a reduced portion which forms the pintle 18. Adjacent to this reduced portion are screw threads 24. A nut 26, internally threaded to fit the threads 24, and having a shoulder 27, is inserted in the hole 20 in the plug 19, which serves as a bearing for the nut 26. In the expander 22 is a notch 28 to accommodate the groove 7 in the body portion and which corresponds with the slot 16 in the tubular member 11.

When the parts are assembled, as shown in Fig. 1, and the expander 22 is positioned so as to exert no pressure on the walls of the tubular member 11, the member 11 will slide freely in the body portion 6. When the nut 26 is tightened, however, it draws the expander 22, by means of the rod 23, into the end of the resilient tubular member 11 and presses the walls thereof against the walls of the body 6 and securely clamps the extension portion 10 relative to the body 6 of the roller. It will be observed that this clamping device may be operated even when the shade is on the roller by reason of the position of the nut 26. The notch 28 in the expander 22, cooperating with the groove 7, prevents the rotation of the expander 22 when the nut 26 is rotated.

Figs. 4 and 5, show another embodiment of the invention. Fig. 4, shows part of a shade roller formed of metal tubing having a main body portion 6 in which is contained the spring and associated mechanism for rotating the roller. In the body portion 6 is a groove 7 in which the end of the shade carried by the roller is secured by means of a fillet of wood or by similar means. The roller has an extension 30 which is slidably connected with the body portion 6 by means of a resilient tubular member 31. This resilient tubular member 31 is permanently secured in the extension 30 by soldering them together at the point 32. The resilient tubular member 31 has, throughout its length, a longitudinal slot 34 which receives the groove 7 in the body portion 6 and the groove 7' in the extension portion 30. The presence of the groove 7 in the slot 34 prevents the relative rotation of the body 6 and the extension 30 and keeps the groove 7 in alinement with the groove 7'. The length of the roller is varied by sliding the extension in and out of the body portion, which changes the distance between the pintle 35 and the pintle on the other end of the roller, which is not shown.

The means shown in Figs. 4 and 5 for locking the extension 30 and the body portion 6 in any desired relative position will now be described. Fig. 5 shows a conical expander 36 in which is a threaded opening 37 and a slot 40. The slot 40 receives the groove 7 in the body 6 of the roller and prevents the rotation of the expander 36. The opening 37 receives the threaded end 41 of the rod 42. The rod 42 has a reduced outer end 35 which forms the pintle for one end of the roller. Immovably secured upon the rod 42 is the collar 45. This collar has an external diameter the same as the internal diameter of the extension portion 30, Fig. 4. The tubular member 31 is secured within the extension 30 so that its outer end is within the walls of the extension, as shown in Fig. 4. The distance between the ends of the extension 30 and the tubular member 31 is equal to about half the depth of the collar 45. The end of the tubular member 31 provides a bearing against which the collar 45 rests. In the collar 45 are holes 46 which enable one to rotate the collar by inserting therein a small nail, a stiff wire, or an appropriate tool.

When the parts of the roller and locking mechanism are assembled, as shown in Fig. 4, the extension 30 is locked relative to the body portion 6 by rotating the collar 45, which in turn rotates the rod 42 which, through the screw 41, draws the expander 36 into the end of the tubular member 31 and expands its walls against the body portion 6.

As will be obvious, various modifications in the structure may be made without departing from the spirit of the invention.

I claim:

1. An extensible sheet metal roller comprising a body portion and an extension portion, said portions being of substantially the same outside diameter and each having a longitudinal groove, a resilient tubular member permanently secured within said extension portion and slidable within said body portion, said member having a slot adapted to receive said groove, and means for locking said member in said body portion comprising a conical expander in the end of said tubular member, a screw for moving said expander along the axis of said tubular member, and means external to the roller for operating said screw.

2. An extensible sheet metal roller comprising a body portion and an extension portion, said portion being of substantially the same outside diameter and each having a longitudinal groove, a resilient tubular member permanently secured within said extension portion and slidable within said body portion, said member having a slot adapted to receive said groove, and means for locking said member in said body portion comprising a conical expander in the end of said tubular member, a rod fixed to said expander, a plug in the end of said extension portion having a hole through which said rod extends, screw threads on said rod adjacent said hole and a nut on said threads bearing against said plug.

3. An extensible sheet metal roller comprising a body portion and an extension portion, said portions being of substantially the same outside diameter and each having a longitudinal groove, a resilient tubular member permanently secured within said extension portion and slidable within said body portion, said member having a slot adapted to receive said groove, and means for locking said member in said body portion comprising a conical expander in the end of said tubular member having a central threaded aperture, a threaded rod having a screw connection with said expander, an internal shoulder in said extension portion, and a collar fixed to said rod adapted to bear against said shoulder.

4. A locking device for a shade-roller extension comprising a conical expander, a screw for moving said expander axially in said extension and means external to said extension for operating said screw.

5. A locking device for a shade roller extension comprising a conical expander in the end of said extension, a rod connected to said expander, bearing surfaces at the outer end of said extension, a threaded section on said rod and a nut thereon resting against said bearing surfaces, whereby said expander may be moved axially relative to said extension.

6. A locking device for a shade roller comprising a conical expander having a threaded aperture, a rod having a threaded end in said aperture, said rod extending through said extension and having a protruding end, a collar fixed on said end, bearing surfaces in said extension for said collar and means on said collar whereby it can be rotated.

In testimony whereof, I have signed this specification.

RUSSELL STEWARD BUSHNELL.